(12) United States Patent
Gawel

(10) Patent No.: US 11,465,497 B2
(45) Date of Patent: Oct. 11, 2022

(54) VIBRATION-TO-ELECTRIC ENERGY CONVERTER

(71) Applicant: Grzegorz Gawel, Zbaszyn (PL)

(72) Inventor: Grzegorz Gawel, Zbaszyn (PL)

( * ) Notice: Subject to any disclaimer, the term of this patent is extended or adjusted under 35 U.S.C. 154(b) by 710 days.

(21) Appl. No.: 16/084,881

(22) PCT Filed: Mar. 10, 2017

(86) PCT No.: PCT/PL2017/000021
§ 371 (c)(1),
(2) Date: Sep. 13, 2018

(87) PCT Pub. No.: WO2017/160172
PCT Pub. Date: Sep. 21, 2017

(65) Prior Publication Data
US 2019/0077260 A1 Mar. 14, 2019

(30) Foreign Application Priority Data
Mar. 14, 2016 (PL) .......................................... 416485

(51) Int. Cl.
*B60K 25/10* (2006.01)
*H02K 7/06* (2006.01)
*F03G 7/08* (2006.01)

(52) U.S. Cl.
CPC ................ *B60K 25/10* (2013.01); *F03G 7/08* (2013.01); *H02K 7/06* (2013.01); *B60K 2025/103* (2013.01); *B60K 2025/106* (2013.01)

(58) Field of Classification Search
CPC .. B60K 25/10; B60K 2025/103; B60G 13/14; F03G 7/08; H02K 7/06
See application file for complete search history.

(56) References Cited

U.S. PATENT DOCUMENTS 3,911,287 A * 10/1975 Neville ............... F03B 13/1815
290/53
4,032,829 A * 6/1977 Schenavar ............. B60G 13/14
322/3

(Continued)

FOREIGN PATENT DOCUMENTS

CN 101954863 A 1/2011
FR 2268660 A1 * 11/1975 ............. B60G 13/14

OTHER PUBLICATIONS

Kuchar Maciej, Siczka Krzysztof, "Assessment of the Possibilities of Energy Recovery System with Suspension Using Air Suspension" [Available at http://www.academia.edu/2374439/Ocena_możliwości_odzyskiwania_energii_z_ukladu_zawieszenia_przy_wykorzystaniu_amortyzatora_pneumatycznego].

(Continued)

*Primary Examiner* — Emma K Frick
(74) *Attorney, Agent, or Firm* — Cherskov Flaynik & Gurda, LLC

(57) ABSTRACT

The subject matter of the invention is a vibration-to-electric energy converter by translating reciprocating motion of vibrating elements of a vehicle to circular motion of a driveshaft of an electric generator, fitted with at least one drive unit containing a toothed gearing and at least one freewheel. The converter according to the invention has a movable element that transmits vibrations to two ends of a drive chain, finished with fixing elements with nuts used for tension adjustments and with tensioning springs, whereby the chain interacts with a small cogwheel of at least one gearing, coupled via a freewheel with a large cogwheel of that gearing, connected by means of a short chain with a drive wheel of at least one electric generator, where both the axis of the gearing and the generator are fitted to a base constituting an immovable element.

20 Claims, 6 Drawing Sheets

(56) References Cited

U.S. PATENT DOCUMENTS

| | | | | |
|---|---|---|---|---|
| 4,113,047 | A * | 9/1978 | Turner | B60K 25/10 180/65.31 |
| 4,387,781 | A * | 6/1983 | Ezell | B60G 13/14 180/65.22 |
| 4,389,843 | A * | 6/1983 | Lamberti | F03B 13/1815 60/507 |
| 4,598,547 | A * | 7/1986 | Danihel | F03B 13/1815 60/507 |
| 5,036,934 | A * | 8/1991 | Nishina | B60K 25/10 180/165 |
| 6,269,636 | B1 * | 8/2001 | Hatzilakos | F03B 13/1815 60/398 |
| 6,711,897 | B2 * | 3/2004 | Lee | F03B 13/1815 60/507 |
| 7,687,931 | B2 * | 3/2010 | Gasendo | F03B 13/186 290/54 |
| 7,791,213 | B2 * | 9/2010 | Patterson | F03B 13/1865 290/53 |
| 7,989,970 | B2 * | 8/2011 | Yeh | B62J 6/10 290/1 C |
| 8,251,183 | B2 * | 8/2012 | Chen | H02K 7/1853 185/39 |
| 8,283,795 | B2 * | 10/2012 | Khoury | B60L 50/52 290/1 R |
| 8,324,752 | B2 * | 12/2012 | Lee | F03B 13/1845 290/53 |
| 8,522,903 | B1 * | 9/2013 | Gasendo | B60K 25/10 180/65.1 |
| 8,610,302 | B2 * | 12/2013 | Lee | F03B 13/1865 290/53 |
| 8,807,258 | B2 * | 8/2014 | Stansbury, III | H02J 7/00 180/165 |
| 9,018,812 | B2 * | 4/2015 | Gimlan | B60T 1/10 310/75 B |
| 9,030,033 | B2 * | 5/2015 | Yoo | F03G 7/08 290/1 C |
| 9,287,753 | B2 * | 3/2016 | Jang | H02K 7/1853 |
| 9,768,665 | B2 * | 9/2017 | Turner | F03D 15/10 |
| 9,995,269 | B2 * | 6/2018 | Sung | F16H 19/0622 |
| 10,112,500 | B2 * | 10/2018 | Liao | B60L 58/30 |
| 2006/0016629 | A1 * | 1/2006 | Huard | B60G 11/181 180/65.1 |
| 2010/0102563 | A1 * | 4/2010 | Akervoll | F03B 13/1885 290/53 |
| 2014/0049051 | A1 * | 2/2014 | Burke | F03G 7/08 290/1 R |
| 2018/0178647 | A1 * | 6/2018 | Newman | F16D 41/069 |

OTHER PUBLICATIONS

Korzybski Wojciech, Rode Henryk, Recuperator Vibration Energy of the Motor Vehicle, Logistyka Jun. 2014, ISSN 1231-5478, s. 5710- 5715; [Also available as: http://www.czasopismologistyka.pl/artykuly-naukowe/send/318-artykuly-na-plycie-cd-3/6563-artykul].

* cited by examiner

--Prior Art--

--Prior Art--

--Prior Art--

VIBRATION-TO-ELECTRIC ENERGY CONVERTER

BACKGROUND OF THE INVENTION

1. Field of the Invention

The subject matter of the invention is a vibration-to-electric energy converter that can be used wherever a vibrating mass has an impact on a fixed surface and its movement must be dampened to ensure stability and operational comfort, which is particularly welcome in various kinds of road vehicles exposed to intrinsic vibrations originating from wheels, seats, trunk, etc. Furthermore, the converter can convert kinetic vibrations to electric energy in stationary vehicles in which micro vibrations are caused for instance by a passing vehicle or a driver or passenger entering the vehicle, thus initiating energy. In particular, this solution can be used in electric or hybrid vehicles, which does not preclude its use in other, traditional passenger and commercial vehicles, buses, off-road vehicles, as well as in rail vehicles, including underground trains or trams.

2. Background of the Invention

To improve powertrain efficiency and performance of mechanical vehicles and to ensure travel comfort and safety, a number of energy recovery methods are used, usually concentrating on kinetic energy. For years, specialists working primarily for big car manufacturers have been trying to find the best solutions allowing for recovering energy lost by the vehicle in the exhaust, suspension and braking systems.

Energy affecting vehicle's motion relative to the surface is available at any time during the vehicle's operation—when the vehicle is being opened, when people enter it, when the engine is started, when the vehicle starts, when gears are shifted, while driving over uneven surface, when the vehicle tilts on turns, and finally while braking, turning off the engine and getting out of the vehicle.

One idea for vehicle energy recovery is to use hydraulic shock absorbers and turbogenerators immersed in fluid, connected with energy receivers (e.g. accumulator batteries). Whenever the shock absorber is compressed, the pressure causes a flow of the hydraulic fluid through the generator's blades, thus generating electric energy. Fluid flow at the compression stage goes through the two low flow resistance valves Z1 and Z3 and through a turbogenerator. At the decompression stage, the liquid flow is strongly dampened at the third valve Z2. On the one hand, recovered energy supplies power to shock absorbers' electronic systems, thus making the motion smoother; on the other hand, it supplies power to the vehicle itself. If the system is installed in a hybrid or electric vehicle, then it feeds the vehicle's power unit.

Another energy recovery method uses a pneumatic shock absorber, which drew the attention of researchers from the Technical University of Lodz. In this case, air is pumped owing to reciprocating motion of a piston in the pneumatic shock absorber's cylinder coupled with non-return valves. When the vehicle is in motion, such a set of shock absorbers is a source of compressed air. The very fact that the four absorbers operate independently offers certain stabilization of the stream of pumped air. An air tank is the key pressure-stabilizing element in the system. To convert the compressed air stream to electric energy, the system is fitted with a turbogenerator. Electric energy from the turbogenerator can be used for on-the-go charging of the vehicle's battery or power units of auxiliary equipment, such as wipers.

The design of such a shock absorber should be compact, should fit inside the spring used in the MacPherson strut, and the absorber's diameter should not be much different from the diameter of a classical hydraulic shock absorber, as shown in drawing FIG. 5. The location of non-return valves should be considered on the shock absorber's body. If their size does not allow it, the leads between the tank and the shock absorber should be as short as possible. The tank should be connected directly to the turbine.

At the time of actual compression and decompression of air in the cylinder 1 of the pneumatic shock absorber heat exchange with the cylinder's walls takes place. However, it is relatively short-timed and for the sake of simplicity it can be assumed that the process is adiabatic. As a result, the conversion of the kinetic energy of the piston (coupled with the vehicle's wheel) to the work of air compression or decompression involves only relatively small losses. Those losses are caused by friction resistance resulting from the relative motion of the piston 2 and the walls of the cylinder 1 (and the relative motion of the piston rod and the surface of the opening in the shock absorber cover). After a certain pressure level is obtained in the chamber of the cylinder 1 where air is being compressed, the non-return valve Z4 (Z2) (connecting the chamber with the collector 3 through a lead) is opened. Air flow through the valve is accompanied by throttling losses, the degree of which depends on the valve's design. The estimated value of those losses is several percent of the air compression energy. The higher the valve opening pressure, the higher the losses, but their relative share in the compressed gas energy decreases. The collector diverts compressed air directly to the connected channel housing the turbine T. Inside the channel, part of the elastic energy of air is converted to the kinetic energy of the turbine. Losses related to the flow of compressed gas in the collector and over the turbine blades represent several percent of the compressed air energy in the shock absorber's cylinder. In the generator G the turbine energy is converted to electric energy, fed through leads, for instance to the battery 4. The losses connected with electric energy generation and transmission are relatively low, usually below 3%. The valve Z4 is opened once the piston 2 in the cylinder 1 has moved by over a half of its distance. If the valve opening pressure is not reached at this point, air does not flow to the collector. As a result, it is then not possible to convert elastic energy to electric energy. When the piston 2 is in motion, air is being compressed in one cylinder chamber and decompressed in the other, until pressure at the outlet from the generator G is achieved. Once it is achieved, the non-return valve Z1 (Z3) is opened at the inlet of a channel connecting the cylinder's chamber with the air outlet downstream of the turbogenerator. As a result, air is being sucked into the cylinder chamber. Losses of air flow through this valve are relatively low. During decompression it is not possible to convert the elastic energy of air accumulated in the cylinder chamber to electric energy. Hence, energy recovery takes place only during air compression in each cylinder chamber, and only after the non-return valve opening pressure is reached. Even then losses occur. The estimated efficiency of kinetic energy recovery from the wheel (in the form of electric energy, stored e.g. in a battery) is below 50%. However, even with such low efficiency, this solution has an advantage over classical hydraulic shock absorbers where energy is lost beyond recovery.

Another known solution is a device for energy recovery from vehicle vibrations. It does not interfere with any powertrain elements, so it does not make the vehicle more prone to failure. Installed under the vehicle operator's seat, it allows for converting the kinetic energy of the vibrating seat to electric energy. The device supports the operation of a gas shock absorber. As shown in drawing FIG. 6, it consists of two meshed toothed racks which—via cogwheels—convert the reciprocating motion of the operator's seat to the circular motion of driveshafts of two freewheels. The freewheels are coupled with the main cogwheel that meshes with the generator shaft cogwheel. Each freewheel transmits torque in another direction. As a result, one rack drives the generator shaft when the seat moves downwards, and the other one drives it when the seat moves upwards. Electric energy generated in the generator is stored in a separate battery or charges the vehicle's main battery.

To ensure constant contact, the racks are pressed against cogwheels by means of textolite ring press rollers fitted in the frame of the recovery device. Steel coupling shafts are connected by means of tongues with freewheels. They are supported by bearings in the frame of the recovery device. The freewheels used in the device are ball freewheels. Energy recovered in this way can be used to power other electronic devices, e.g. a mobile phone; alternatively, if an additional electronic system is installed, it can be used for charging capacitors supporting quick, pulsed charging and discharging. Such capacitors are an excellent option for applications requiring short but powerful impulses occurring at considerable intervals.

The specific nature of its design and operation makes the energy recovery device useful only for vehicles that operate on dirt roads or in off-road conditions, such as agricultural tractors or off-road vehicles.

Another known solution is a mechanical system for energy storage and its use in motor vehicles, disclosed in the American specification of the invention U.S. Pat. No. 4,813,509 (A1), as shown in drawing (FIG. 7). The system stores energy in a spring when the vehicle is braking, as when stopping or going downhill, and releases energy stored to help the vehicle engine when starting or when going uphill. A mercury switch can serve as an inclinometer in a simple version of the invention. The mercury switch when tipped in downhill direction actuates a clutch system that, for braking, connects a first end of a coil spring to the engine driveshaft and a second end of the coil spring to the frame of the vehicle, for winding up the coil spring in braking and for steering braking energy in the coil spring. When the mercury switch is tipped in uphill direction, it actuates the clutch system so that it disconnects the first end of the coil spring from the engine driveshaft and connects it to the frame of the vehicle, and disconnects the second end of the coil spring from the frame of the vehicle and connects it to the engine driveshaft, helping power the vehicle. Neutral, and manual override, provisions permit a vehicle driver to change operation of the system when desired or to disable operation of the system.

SUMMARY OF THE INVENTION

The vibration-to-electric energy converter being the subject matter of the present invention constitutes a kinetic energy recovery system whereby the conversion of kinetic energy to electric energy is carried out by means of an electric generator. Recovered energy is stored in an energy storage device and/or immediately consumed.

The conversion of vibrations to electric energy is effected by translating the reciprocating motion of vibrating elements of a device, particularly a vehicle, to the circular motion of the electric generator driveshaft, fitted with at least one drive unit consisting of a toothed gearing and at least one freewheel. In accordance with the invention, the converter is fitted with a movable element that transmits vibrations to two ends of a drive chain finished with fixing elements with nuts used for tension adjustments and with tensioning springs. The chain interacts with a small cogwheel of at least one gearing, coupled by means of a freewheel with a large cogwheel of the same gearing, connected with a short drive chain with the drive wheel of at least one electric generator. Both the gearing axle and the generator are fitted to an immovable base.

The drive unit is connected with an immovable element that does not vibrate during the device's operation or the vehicle's motion and with a movable element, flexibly suspended, changing its position relative to the immovable element in up-and-down movements.

The movable element has the form of a body. The drive chain is stretched between two of the body's arms; alternatively it is durably fixed to the arm of a lever element constituting a double arm lever. Its other arm has two holes for the installation of fixing elements with nuts and drive chain springs.

Preferably, the drive chain interacts with small cogwheels of two gearings coupled by means of freewheels with large cogwheels connected by means of short drive chains with drive wheels of two electric generators.

The gearings are positioned next to each other, either on two axes or on the same axis.

Preferably, the immovable element is part of the vehicle's body (most preferably the floor), whereas the movable element is fitted between the vehicle's wishbone and body and is constituted by the vehicle's suspension.

In the solution according to the invention the drive chain transmits the entire energy of vibrations to the small cogwheel of the electric generator's drive unit gearing. System tension adjustment is made possible by locking and clamping nuts.

The solution according to the invention is a simple device that recovers energy released by the vehicle upon its gravitational impact on the drive surface, which usually is lost beyond recovery. The device converts the vehicle's vibrations energy to electric energy. As a result, the vehicle's efficiency and performance are improved, and its effect on the environment is reduced by lowering the emission of pollutants. Importantly, the solution according to the invention can be used wherever vibrations occur between a fixed element (particularly one of significant weight) and a vibrating element, where the vibrating element is permanently but movably tethered to the point of reference. The vibration-to-electric energy converter can be successfully used in the case of a ship engine and hull; likewise, it can be used for vibration isolation and for converting vibrations to energy in railways, bridges, gangways, or in buildings exposed to noise and vibrations caused by vibrations from adjacent production plants, surface railways (trams, trains) and/or underground railways (subway lines), oversize vehicle traffic, etc.

BRIEF DESCRIPTION OF THE DRAWINGS

The invention together with the above and other objects and advantages will be best understood from the following detailed description of the preferred embodiment of the invention shown in the accompanying drawings, wherein.

DETAILED DESCRIPTION OF THE INVENTION

Figure 1:
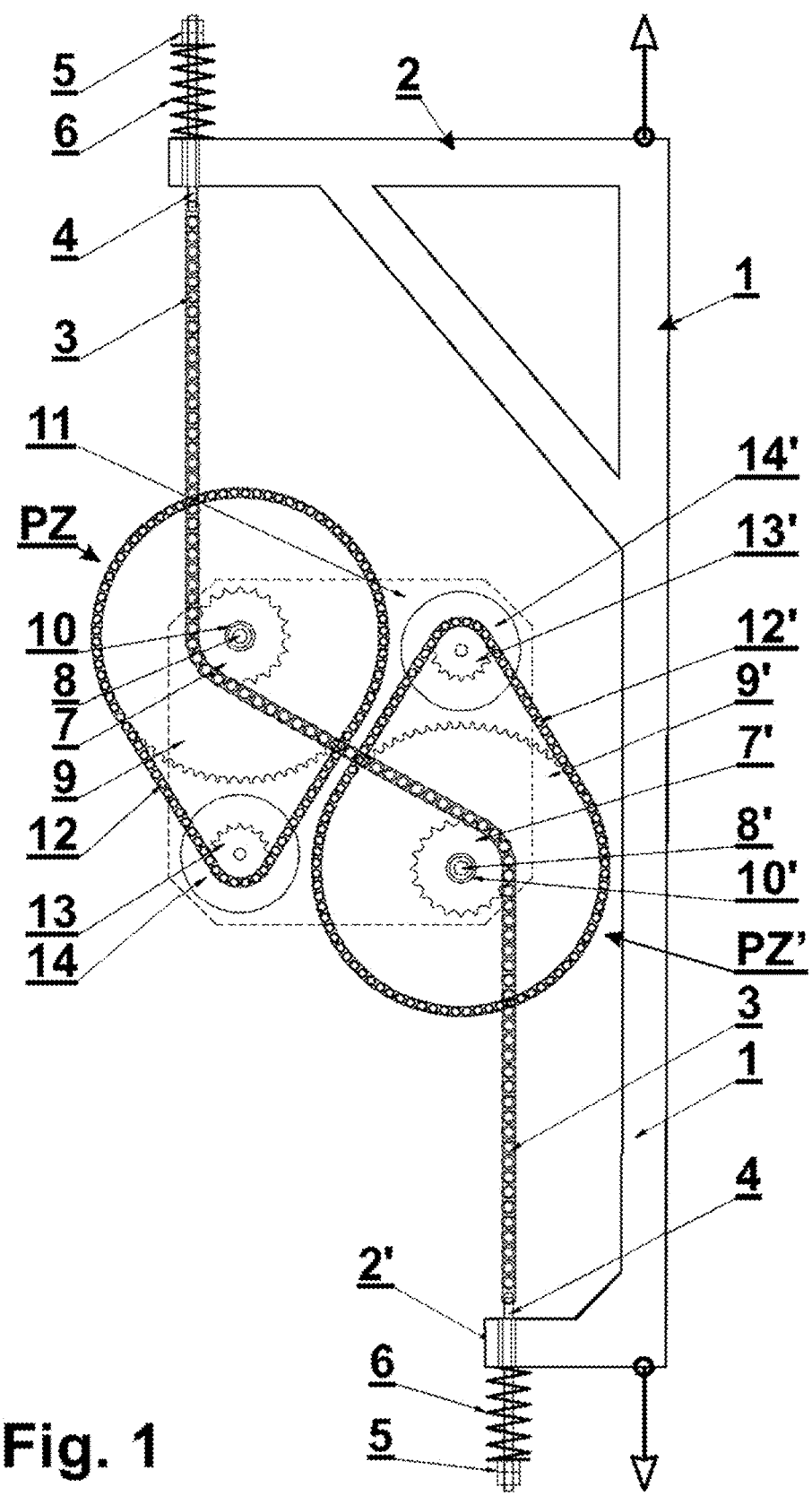
FIG. 1 is a front view of a vibration-to-electric energy converter according to the first embodiment of the present invention.
Figure 2:
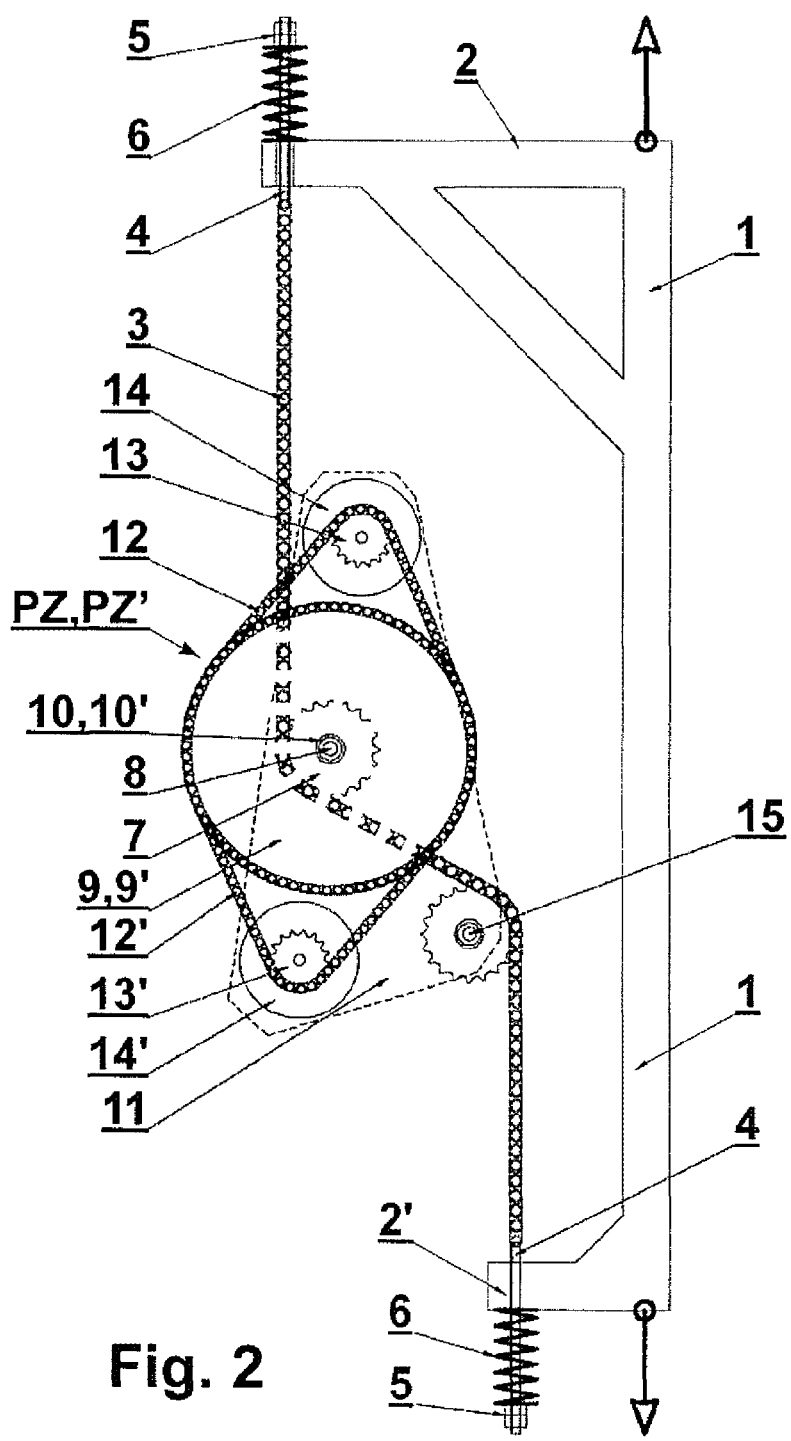
FIG. 2 is a front view of a vibration-to-electric energy converter according to the second embodiment of the present invention.
Figure 3:
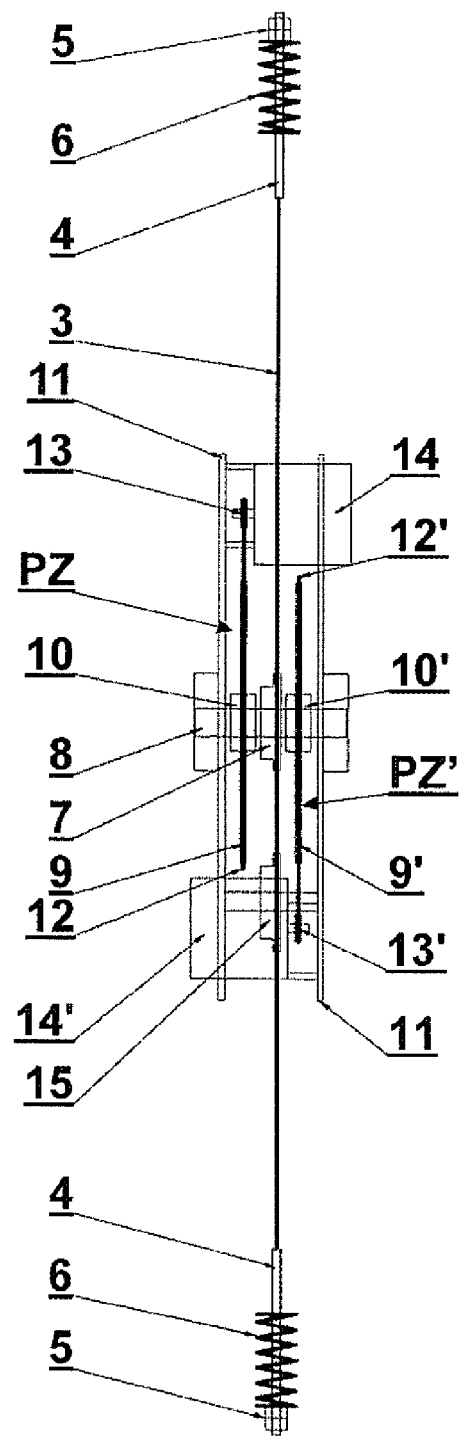
FIG. 3 is a side view of the vibration-to-electric energy converter according to the second embodiment of the present invention.
Figure 4:
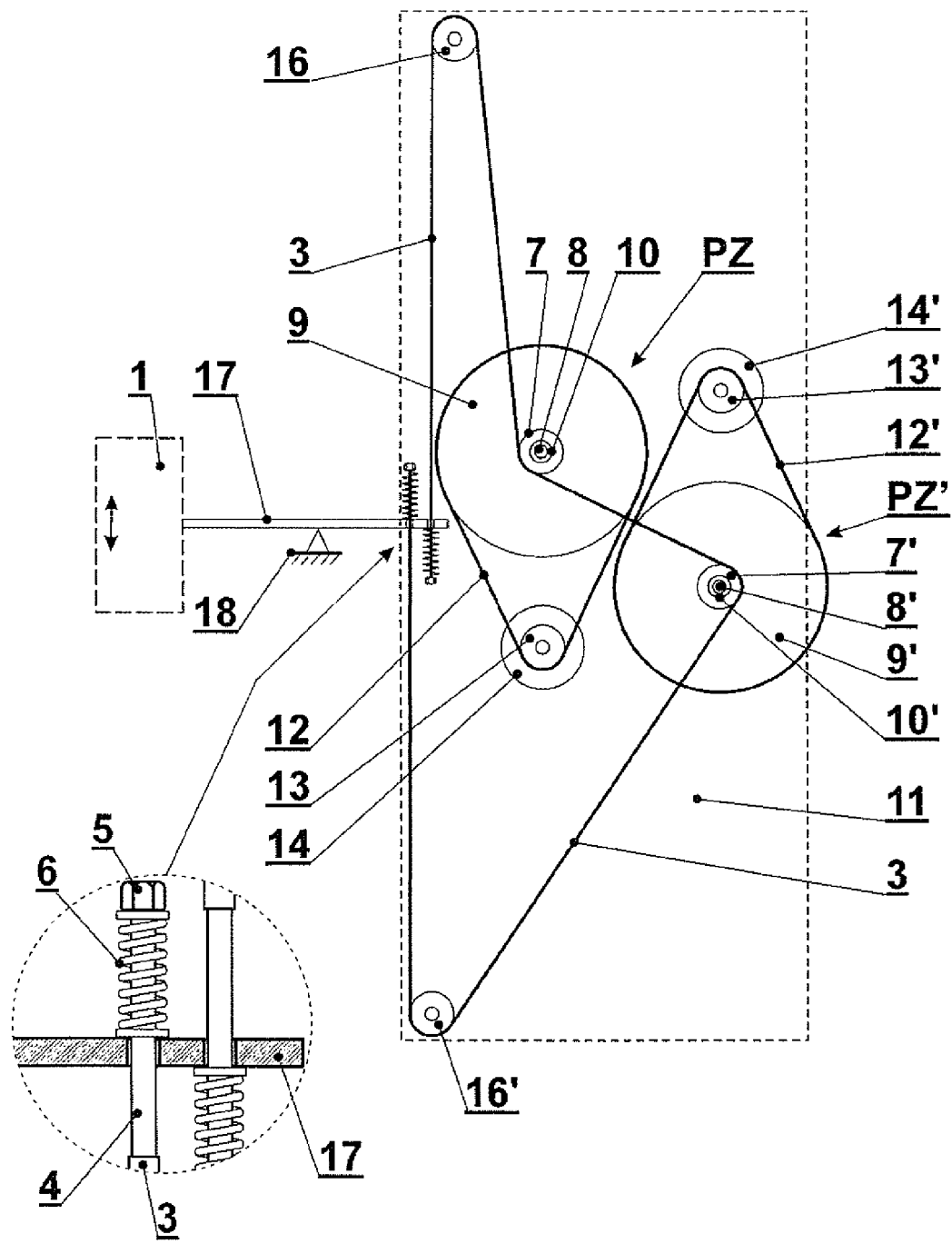
FIG. 4 is a front view of a vibration-to-electric energy converter according to the third embodiment of the present invention.
Figure 5:
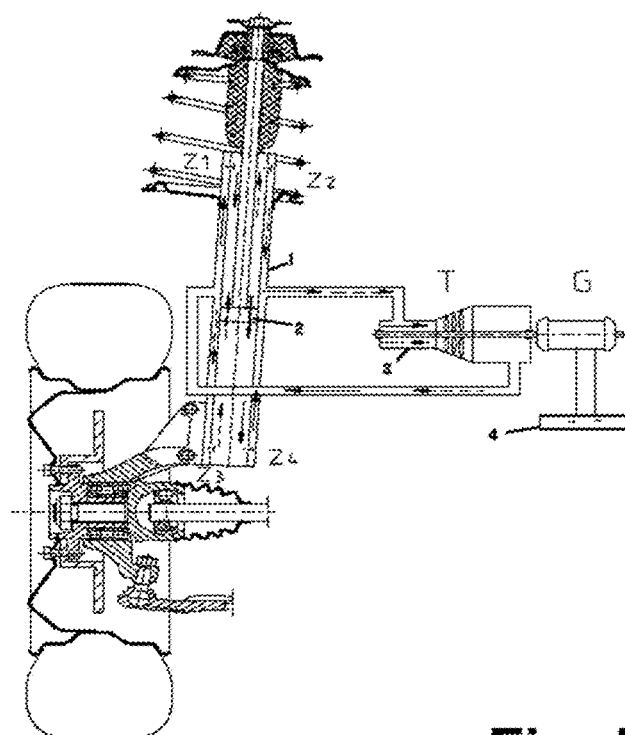
FIG. 5 is a schematic view of a hydraulic shock absorber according to prior art.
Figure 6:
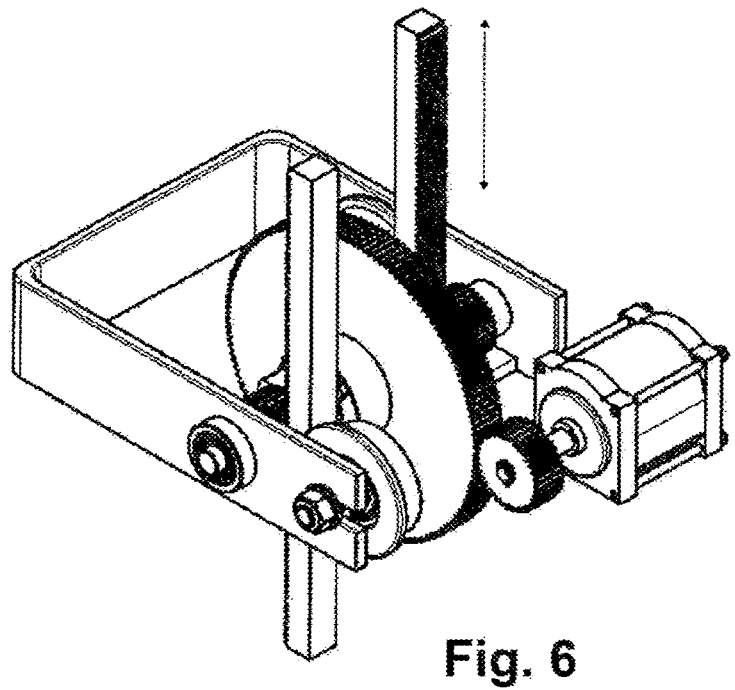
FIG. 6 is a schematic view of a device for converting vehicle vibration into electric energy according to prior art.
Figure 7:
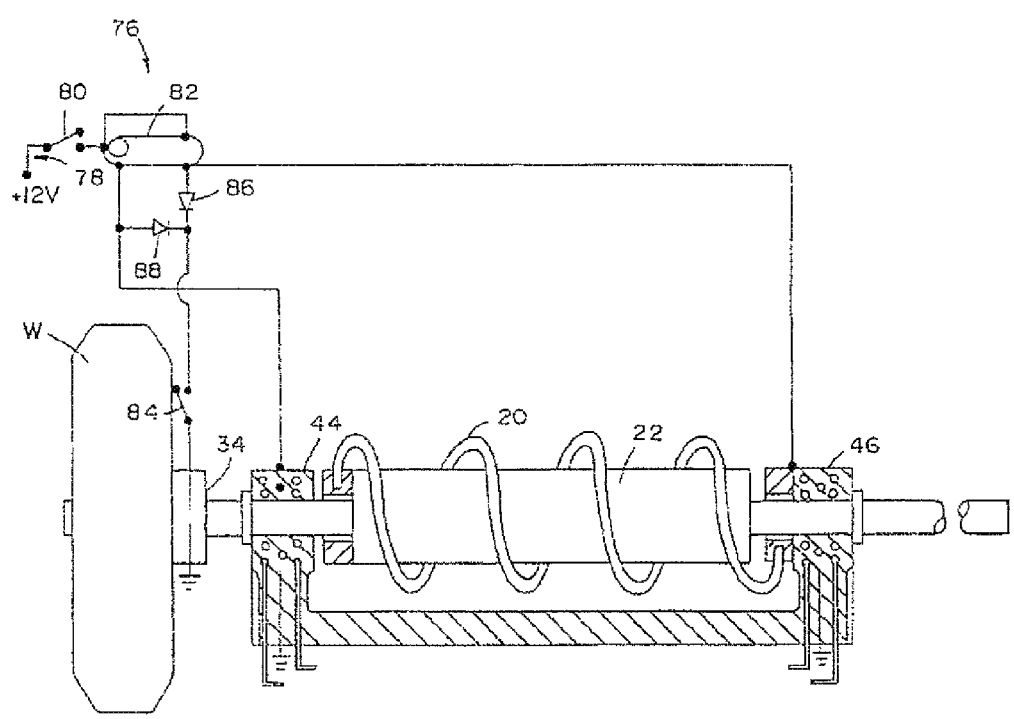
FIG. 7 is a schematic view of a mechanical system for energy storage according to prior art.

Example embodiments of the present invention are shown in a schematic drawing, where FIG. 1 shows the front view of the first embodiment vibration-to-electric energy converter, FIG. 2—the front view of the second embodiment vibration-to-electric energy converter, FIG. 3—the side view of the second embodiment vibration-to-electric energy converter, and FIG. 4—the front view of the third embodiment vibration-to-electric energy converter.

The first embodiment of the vibration-to-electric energy converter according to the present invention has a movable element 1 that transmits the vehicle's vibrations and constitutes (in this particular embodiment) the converter's body. Between arms 2, 2' of the movable element 1 a drive chain 3 is stretched, finished with fixing elements 4 with nuts 5 used for tension adjustments. Between the arms 2, 2' of the movable element and the nuts 5 tensioning springs 6 are positioned, also serving the function of tensioning and additional propulsion.

The drive chain 3 interacts with two cogwheels 7, 7' of the gearing PZ, PZ' positioned on the same axes 8, 8' with large cogwheels 9, 9' and freewheels 10 connected with them.

The axes 8, 8' are fixed to an immovable base 11, being part of the vehicle's body. The large cogwheels 9, 9' constitute a gearing and simultaneously serve as flywheels. The cogwheels 9, 9' are connected by means of short chains 12, 12' with toothed drive wheels 13, 13' of direct current generators 14, 14'.

The drive chain 3 and the gearings PZ, PZ' constitute drive units of the electric generators 14, 14'.

In the second embodiment, the design of the converter is similar to that in the first embodiment, however, a drive chain 3 interacts with one cogwheel 7, shared by both gearings PZ, PZ' and with a wheel of a tensioner 15, while big cogwheels 9, 9' of the gearings PZ, PZ' are positioned on the same axis 8 with the wheel 7 and receive torque from that axis via one-way bearings 10, 10'. With the help of short chains 12, 12', the toothed wheels 9, 9' drive two opposite drive wheels 13, 13' of generators 14, 14', fixed on a base 11.

In the third embodiment, a drive chain 3 of the converter interacts with two small wheels 7, 7' of gearings PZ, PZ' positioned on the same axes 8, 8' with large cogwheels 9, 9' and one-way bearings 10, 10' connected with them. A chain 3 goes through sprockets 16, 16' towards the center of the converter and is set—by means of its fixing elements 4 with nuts 5 and tensioning springs 6 in two openings of a lever element 17 rotationally fixed on a support 18 and transmitting vibrations of a movable element 1, e.g., a vehicle's suspension.

Vibration-to-electric energy converters according to the present invention have been used in a passenger car at every wheel, thus obtaining eight independent power sources (electric generators), which proved to be a significant source of energy for the vehicle.

Each vibrations converter was permanently connected with an immovable element 11 (in this case the vehicle's floor) that does not vibrate when the vehicle is in motion and with a movable element 1 (the vehicle's suspension) whose relative position to the immovable element (floor) 11 changes in up-and-down movements.

Energy in each of these devices was generated upon each change of the position of the movable element 1, i.e. the vehicle's suspension, in relation to the immovable element 11, i.e. the vehicle's floor. Such changes occurred both when the vehicle was in motion, i.e. from the time of opening the vehicle and starting the engine, when the vehicle started, when gears were shifted, while driving over uneven surface, when the vehicle tilted on turns, and finally while braking, turning off the engine and getting out of the vehicle, and while the vehicle was stationary, when micro vibrations were caused for instance by a passing vehicle or by a driver or passengers entering the vehicle, thus initiating kinetic energy through vibrations. Each time, the movable element 1 moved up and down. Each such movement was transmitted via the drive chain 3 to the small cogwheels 7 and 7' of the two independent drive units of the electric generators 14, 14'. The drive chain 3 transmitted the entire energy of vibrations to two independent systems. Vibrations had different amplitudes and speeds, which could result in breaking the chain upon sudden movement. Therefore, the drive chain 3 is fastened by means of a system consisting of a threaded fixing element 4, allowing for adjusting its tension by means of locking and clamping nuts 5. In their turn, each of two tensioning (and simultaneously starting and propelling) springs 6 served important functions. The first one dampened sudden start of the system by becoming compressed. The other compressed spring, once it has reached its maximum compression, became released, smoothly returning the accumulated energy, thus reinforcing the system's impact on the electric generators 14, 14'. As a result, the system was more efficient than it would have been without the springs.

When the movable element 1 (in this case: the vehicle's suspension) was moving up, the spring 6 was compressed between the suspension 1 and the locking and clamping nuts 5; subsequently it was released and set the small cogwheel 7 in motion. The cogwheel 7 was connected with the big cogwheel 9 by means of the one-way bearing 10. Once set in motion, the big cogwheel 9 transmitted energy via circular motion to the short chain 12 and then to the drive wheel 13 installed on the axis of the generator 14. As a result, even when the upward motion stopped, the system continued to operate, gradually reducing its power being slowed down by internal resistances and receivers of energy from the generator 14. The system's action was sustained or initiated by another upward movement of the movable element 1 (i.e., the vehicle's suspension).

The system behaved similarly during downward movement of the movable element 1. The spring 6 fitted between the movable element 1 the vehicle's suspension) and the locking and clamping nuts 5 was compressed; when the spring's compression energy became smaller than the system's resistance, the spring began to release and thus to initiate the motion of the small cogwheel 7', positioned on the same axis as the large cogwheel 9', connected through the one-way bearing 10'. The cogwheel 9' transmitted its energy by means of the short chain 12' to the drive wheel 13' of the generator 14', as a result of which the generator 14' generated electric energy, being the ultimate effect of the system's operation.

The use of the short chains 12, 12' to drive the generator 14, as shown in the above examples, does not preclude the possibility of using other solutions; for instance, the said chains could be replaced with another form of transmission. However, in the examples presented above, the chain was used because of the greatest efficiency in transmitting energy.

Furthermore, the said generators 14, 14' can generate direct or alternating current, depending on the needs. Such current can either be accumulated (as in the above examples), but it can just as well be immediately consumed.

KEY

1. —movable element,
2. —arms of movable element,
3. —drive chain,
4. —fixing element,
5. —locking and clamping nut,
6. —tensioning spring,
7. —small cogwheel of gearing,
8. —gearing axis,
9. —large cogwheel of gearing,
10. —freewheel,
11. —immovable element,
12. —short chain,
13. —drive wheel of electric generator,
14. —electric generator,
15. —wheel of tensioner,
16. —sprocket,
17. —lever element,
18. —support,
PZ. —gearing.

The invention claimed is:

1. A vibration to electric energy converter comprising:
    a drive chain which is suspended by tensioning springs on opposing arms attached to a moveable element which acts as a source of vibrations;
    two drive cogwheels, wherein movement of the drive chain rotates the two drive cogwheels; wherein each drive cogwheel moves in a different single direction due to an action of a one-way bearing;
    two large transfer cogwheels each attached to a corresponding drive cogwheel; and
    two generator cogwheels, each connected to the large transfer cogwheel by a short chain loop;
    wherein said generator cogwheels drive an electrical generator which creates an electromagnetic field and electricity while creating physical resistance for the converter and is adapted to act as a shock absorber.

2. The converter of claim 1 wherein the drive chain is fixed to the tensioning springs using fixing elements adapted to tension adjustment.

3. The converter of claim 1 wherein said moveable element arms are permanently attached to the moveable element.

4. The converter of claim 1 wherein said drive cogwheels and the large transfer cogwheels rotate around an axis.

5. The converter of claim 4 wherein said axis is attached to an immovable surface separate from the moveable element.

6. The converter of claim 5 wherein said immovable surface is connected to a vehicle body.

7. The converter of claim 4 wherein said converter is adapted to convert a vehicle's vibrations.

8. The converter of claim 4 wherein said drive chain is stretched between the arms of the moveable element.

9. The converter of claim 8 wherein said drive chain is terminated with adjustable fixing elements.

10. The converter of claim 1 wherein said generator cogwheels comprise toothed drive wheels.

11. A vibration to electric energy converter comprising:
    a drive chain which is suspended by tensioning springs on opposing arms attached to a moveable element which acts as a source of vibrations;
    a single drive cogwheel turning on an axis, wherein movement of the drive chain rotates the drive cogwheel;
    two one-way bearings on same axis as the drive cogwheel; each one-way bearing turning in one direction;
    two large transfer cogwheels each attached to a corresponding one-way bearing; and
    two generator cogwheels, each connected to a corresponding large transfer cogwheel by a short chain loop;
    wherein said generator cogwheels drive an electrical generator which creates an electromagnetic field and electricity while creating physical resistance for the converter and is adapted to act as a shock absorber.

12. The converter of claim 11 wherein said converter is adapted to convert a vehicle's vibrations.

13. The converter of claim 11 further comprising a tensioner with a wheel communicating with the drive chain.

14. The converter of claim 11 wherein said two large transfer cogwheels receive torque from one-way bearings.

15. The converter of claim 11 wherein said generator is mounted to a base.

16. The converter of claim 15 wherein said base comprises a stationary part of a vehicle.

17. The converter of claim 16 wherein said converter is attached to the vehicle's wheel.

18. The converter of claim 16 wherein said converter operates while the vehicle is in motion.

19. The converter of claim 11 wherein said generators generate direct current.

20. The converter of claim 11 wherein said generators generate alternating current.

* * * * *